May 15, 1951     A. J. WEATHERSON     2,553,122
MULTIPLE PURPOSE CONVERTIBLE FURNITURE
Filed Sept. 9, 1946     3 Sheets—Sheet 1
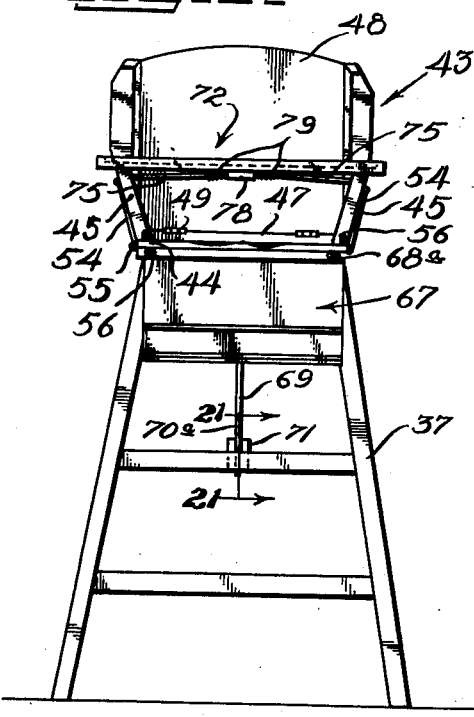
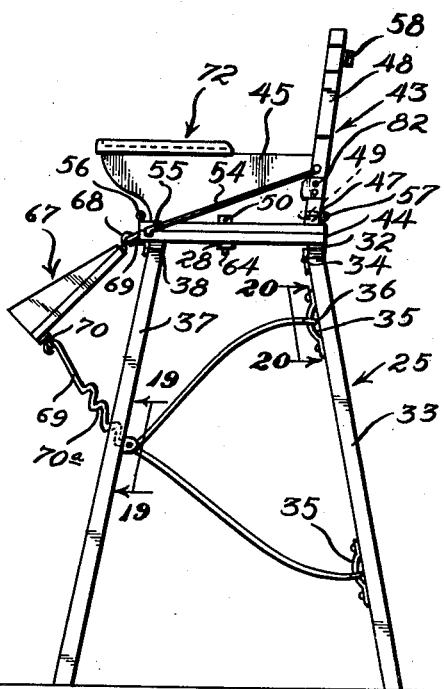
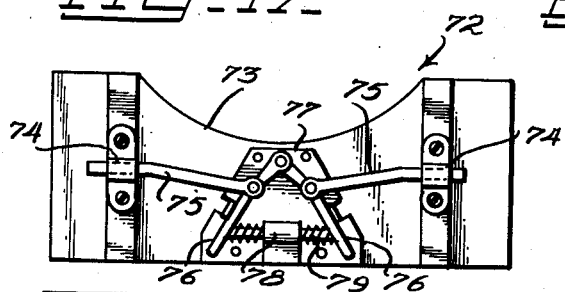
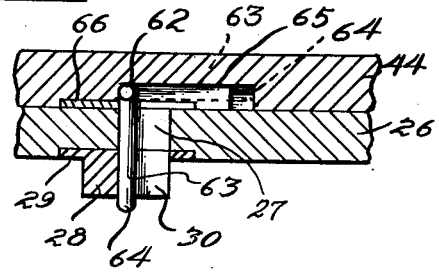
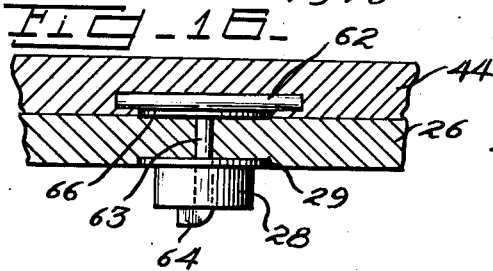
Inventor
Authur J. Weatherson
By Clarence A. O'Brien
and Harvey B. Jackson
Attorneys

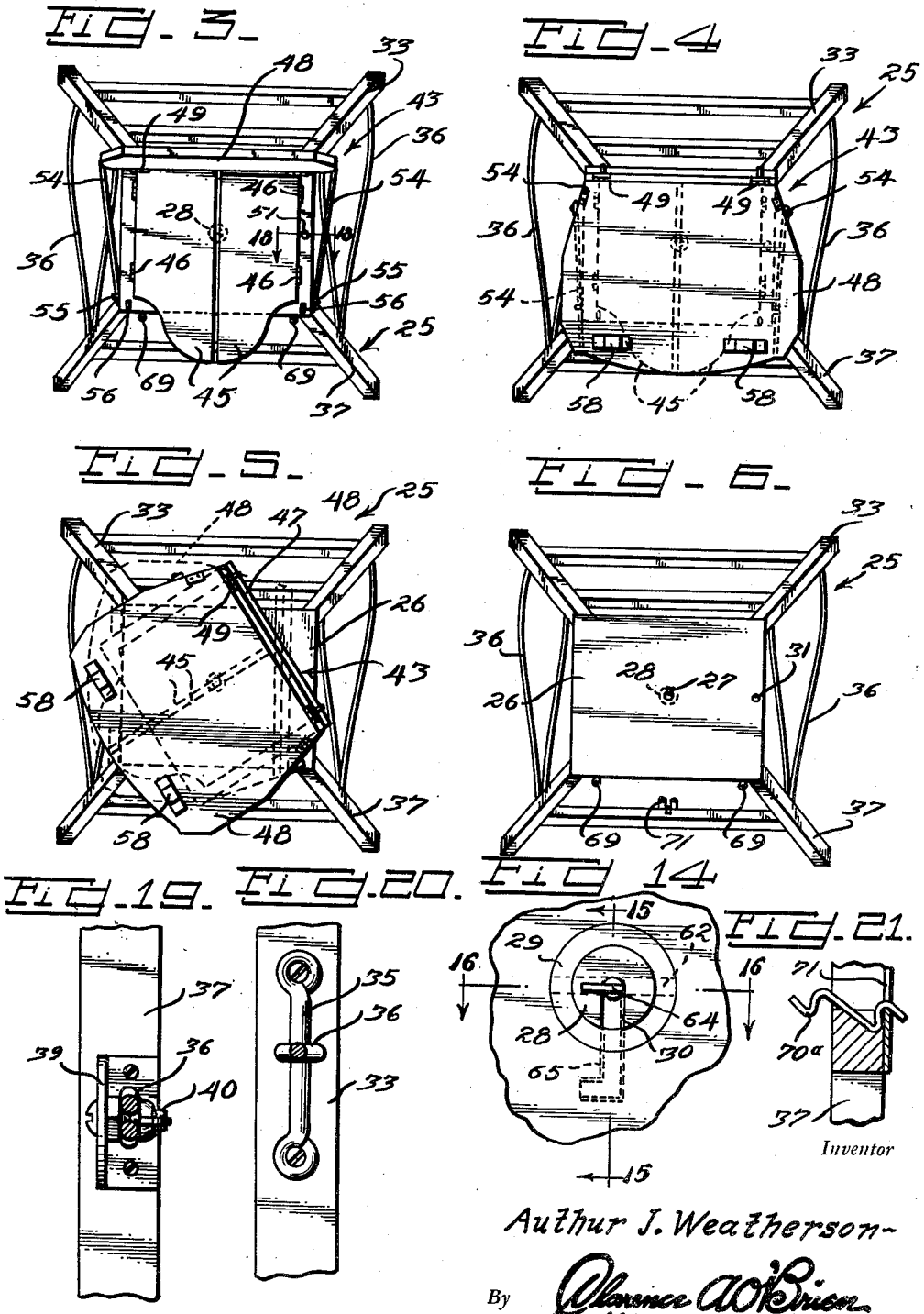

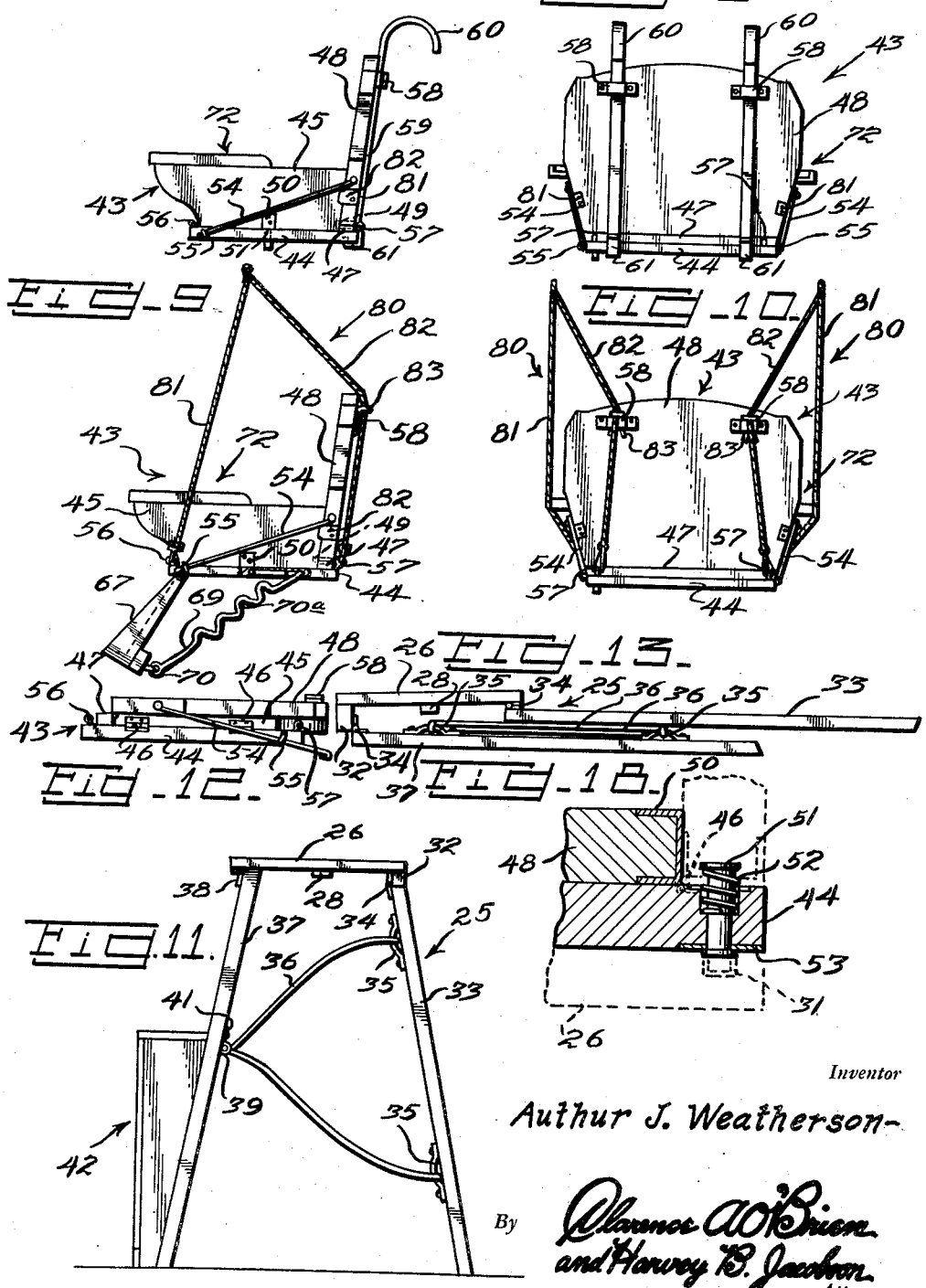

Patented May 15, 1951

2,553,122

UNITED STATES PATENT OFFICE 2,553,122

MULTIPLE PURPOSE CONVERTIBLE FURNITURE

Arthur J. Weatherson, Renton, Wash.

Application September 9, 1946, Serial No. 695,589

9 Claims. (Cl. 155—39)

The present invention relates to convertible furniture of a household type and has more particular reference to a novel structural assemblage in which the components or units cooperate and combine their functions to provide a kitchen step-stool, a knockdown high-chair, a seat structure susceptible of being properly utilized as a baby chair in an automobile or the like, and a seat or chair structure which, when used in connection with proper suspension ropes or equivalent devices may be used as a child's swing.

One phase of the invention has to do with a portable base unit, the latter embodying a platform having hingedly mounted portable leg frames attached thereto, the leg frames being sustained in erected useful positions by stay yokes, one leg frame serving to accommodate a detachable step and said platform being provided centrally with a keyhole slot and keeper collar, which features serve to accommodate an assembling and retaining latch on a detachable seat unit.

Another object of the invention pertains to the aforementioned seat or chair unit, the same comprising a seat board, hingedly mounted and portable side wings, hinged mounted back rest and necessary accessories and parts which permit said seat unit to be employed as a detachable part for the aforementioned step-stool to convert same into a high-chair, and said parts being further useful in accommodating necessary metal suspension straps on the one hand, and suspension ropes or cords on the other to allow said seat unit to be used, as before indicated, either as an automobile seat or as a seat structure for a swing.

Another object of the invention has to do with a portable, compact and convenient seat structure of the aforementioned type, the same constructed to accommodate metal straps, the straps being bent at corresponding ends to provide hooks to take over the back of an automobile seat and being provided at their opposite ends with assembling hooks cooperable with sockets in the seat board to provide the desired assembled arrangement of parts.

Another object of the invention has to do with a stool structure having a detachable step, said stool structure being constructed to accommodate a seat unit or structure, novel means being provided between the two units whereby they may be used singly or collectively, depending on the results required.

Other objects, features and advantages will become more readily apparent through the following description and the accompanying illustrative drawings.

In the drawings, wherein like numerals are employed to designate like parts throughout the views:

Figure 1 is a front elevation of the complete assemblage of parts showing construction of same and illustrating how they are co-related and combined to provide a high-chair, this with a detachable eating tray;

Figure 2 is a side view of Figure 1 also showing the high-chair and serving to bring out the construction of the arrangement of the stirrup-like foot rest, which is detachable, the stay devices and other parts;

Figure 3 is a top plan view, this also showing the high-chair but showing the side-pieces or wings of the seat structure folded down to an out-of-the-way compact and convenient position;

Figure 4 is a top plan view of the structures shown in Figure 3 with the back rest of the seat unit also folded down on top of the infolded wings;

Figure 5 is a top plan view based on Figures 3 and 4 and showing the seat unit rotated bodily in relation to the stool or base unit, whereby to make way for bodily detaching said seat unit;

Figure 6 is a view following Figure 5, also a top plan view, this showing the appearance of the top of the base unit or stool after the seat unit has been completely unlatched and detached;

Figure 7 is a side elevational view of the seat unit per se provided with detachable hanger devices connectable with said unit to permit same to be employed as an automobile seat;

Figure 8 is a rear elevational view of said unit observing same in a direction from right to left of Figure 7;

Figure 9 is a view similar to Figure 7, a side view of the seat unit showing the stirrup-like foot rest attached and also showing suspension ropes, permitting the structure to be employed as a swing;

Figure 10 is a rear elevational view of the structure seen in Figure 9, this observing Figure 9 in a direction from right to left, but with the stirrup-like foot rest omitted;

Figure 11 is a side elevational view of the base or stool unit per se with the step attached;

Figure 12 is an edge elevational view of the seat unit collapsed or folded;

Figure 13 is an edge elevational view of the base or stool unit folded;

Figure 14 is a fragmentary bottom plan view employed to bring out the construction and arrangement of the L-shaped assembling latch and keeper collar therefor;

Figures 15 and 16 are sectional views at right angles to each other, said views being taken approximately on the planes of the lines 15—15 and 16—16 of Figure 14;

Figure 17 is a bottom plan view of the detachable high-chair tray;

Figure 18 is an enlarged fragmentary sectional view taken approximately on the plane of the line 18—18 of Figure 3;

Figure 19 is an enlarged detail view on the line 19—19 of Figure 2;

Figure 20 is a similar detailing view on the line 20—20 of Figure 2, looking in the direction of the arrows; and, Figure 21 is a detail section taken approximately on the plane of the line 21—21 of Figure 1.

It seems advisable to describe first the base structure or unit since this is the foundation of the overall structure. Attention is therefore directed to Figure 11 of the drawings where it will be seen that said structure, as a unit, is in the nature of a leg supported stool. It is of appropriate materials and dimensions and is denoted, as a unit by the numeral 25. It comprises a platform board 26 of general rectangular form, the same being centrally provided with a keyhole slot 27 and underneath and in alignment with said key-hole slot with a keeper collar 28, this collar as shown in Figure 15 is attached by the flange 29, said collar being provided with a lateral slot 30 co-acting properly with the key-hole slot 27. This platform is also provided marginally with a socket 31 (Figs. 6 and 18) which serves as a keeper-hole in a manner to be hereinafter described. There is a wooden cleat on one edge portion of the under-side of the platform 26, said cleat denoted by the numeral 32 (see Figure 11) and the rear leg frame means 33 is hinged to said cleat as at 34, said leg means 33 having clips 35 to which the arm portions of the V-shaped yoke-stays 36 hingedly connect. The forward or front leg frame means is differentiated by the numeral 37 and is hingedly attached at 38 to the underside of the platform 26. The legs in this means 37 are provided with L-shaped brackets 39 (see Figure 19) having bolts and wing nuts 40 to accommodate the eyes on the stay-yokes 36. Thus, the hingedly mounted leg frames on the platform make it possible to erect a stool as shown in Figure 11 or to fold the parts in collapsed position as shown in Figure 13. The step 42 is attached to the front leg frame structure 37 and held in place detachably by a suitable turn-button 41.

Reference is had now to the seat or chair unit covered, with some degree of particularity, in Figures 7 to 10 inclusive. Said nut, as an overall unitary structure, is denoted by the numeral 43. It is characterized by substantially flat seat or board bottom 44 having sides or wings 45 hingedly attached thereto as at the points 46 (Figs. 3 and 12). With this arrangement the wings, which are normally vertical and at right angles to the bottom 44 may be folded down into a plane even with each other and in overlapping relation with the board as shown in Figure 3. There is a cross-piece or riser 47 secured across the rear edge portion of the seat board and this serves to accommodate the back 48 of the chair which back is hinged to said cross-piece as indicated at 49.

Reference is had now to Figure 18 wherein it will be observed that one of the side wings 45 is provided with a U-shaped metal reinforcing clip. This serves as a wear member and is adapted to swing down against the headed end of the keeper bolt 51. This bolt is slidably mounted in a bore in the seat board and is pressed normally up by the action of a coiled spring 52. The lower headed end of the keeper bolt projects through and beyond the centrally apertured wear washer 53 and when the keeper bolt is engaged it projects down into the aforementioned keeper socket or well 31 in the top board of the stool 26.

I now direct attention to stay-links 54 on opposite sides of the chair and outwardly of the so-called hinged wings, said links denoted by the numerals 54 being hingedly connected to the back rest 48 at corresponding ends and slidably mounted through guide eyes 55 at opposite ends. I also direct attention to eye bolts arranged in pairs 56 and 57 on the frontal and rear edge portions of the seat board, these for a purpose to be described. Reference being had to Figure 8, the numerals 58 designate assembling clips these secured to the upper rear surface of the back rest 48. They serve to accommodate strap irons 59 which are detachably mounted in place. That is to say the straps are mounted properly in the clips 58. Near the upper ends the straps are bent into large hooks 60 to engage or take-over the back rest of an automobile seat. The lower ends of the straps 59 are provided with smaller hooks 61 whose bill portions engage in suitable retaining sockets provided therefor in the adjacent under-surface of the seat board 44.

The entire chair or seat unit 43 is readily usable by itself or may be equally well used in conjunction with the stool. When employed on the stool it serves to convert same into a high-chair. Special attaching and retaining means is therefore provided for securing the two units 43 and 25 together. I have already set forth the fact that the top or platform 26 of the base unit 25 is provided with a key-hole slot 27 and a cooperable notched retention collar 28. It follows that the seat board is provided centrally with a receding latch pin arrangement of a retractible and projectible type. More specifically, the latch pin comprises a T-shaped pin (Figs. 14, 15, 16) whose head portion 62 is rockably or hingedly mounted in a bearing gouged out from the wood of the chair bottom. The stem 63 terminates in a laterally directed detent 64 and the stem, when set at right angles to the chair board, is projectible through the notch 30 of the collar and the detent is engaged with the surface of the collar as shown for example in Figure 15, this when the latch is fastened. There is an L-shaped groove 65 provided into which the latch folds and recedes when not in use. There is also a notched or horseshoe-shaped washer 66 provided to retain the parts in properly assembled hingedly operable relationship.

In practice the assembling and retaining latch 63 is withdrawn from its groove or cavity 65 and, thus projecting, is then lined up with the key-hole slot 27. This means that the lateral terminal 64 has to be properly lined up with the restricted or narrow portion of the key-hole slot, as is obvious. Then, the latch is forced down through the key-hole slot and through the notch 30 in the keeper collar 28. Then, by making a quarter of a turn, the detent 64 engages the collar in such a way as to temporarily "lock" the seat unit on the base unit. Also, the aforementioned spring pressed keeper bolt 51 is pressed down into its socket 31 and is held in place when the adjacent panel or wing 45 is swung up to vertical position lower projecting end being releasably engageable with said keeper socket, a pair of side wings hingedly mounted on marginal edge portions of said seat board, the lower hinged edge portion of one wing being engageable with the spring pressed upper end portion of said keeper so that when the wings are vertical to the seat board, said one wing serves to press the keeper, against the tension of the spring, into said socket, the keeper fitting into the keeper socket serving to prevent relative rotation of the boards and to maintain the latter in assembled relationship, and a tray, said tray being releasably disposed on the top edges of the side wings and having means releasably connecting its end portions with the wings, said means serving to spread the wings apart and to prevent folding of same and to fold said one wing in a position to maintain the keeper effectively seated in the keeper socket.

7. A convertible chair construction of the class shown and described comprising a base unit embodying a leg supported board provided with a central slot and further provided with an eccentrically arranged keeper socket, and a seat unit embodying a complemental seat board superimposed directly on said first named board and corresponding in size and shape to the latter and provided on its underside with a centrally disposed latch pin, said latch pin being releasably and rotatably connectable with said slot, said seat board being provided eccentrically and adjacent one marginal edge with a spring released keeper, said keeper being projectable above and below top and bottom surfaces of the seat board, the lower projecting end being releasably engageable with said keeper socket, a pair of side wings hingedly mounted on marginal edge portions of said seat board, the lower hinged edge portion of one wing being engageable with the spring pressed upper end portion of said keeper so that when the wings are vertical to the seat board, said one wing serves to press the keeper, against the tension of the spring, into said socket, the keeper fitting into the keeper socket serving to prevent relative rotation of the boards and to maintain the latter in assembled relationship, and a tray, said tray being releasably disposed on the top edges of the side wings and having means releasably connecting its end portions with the wings, said means serving to spread the wings apart and to prevent folding of same and to hold said one wing in a position to maintain the keeper effectively seated in the keeper socket, and a back rest hingedly mounted on a marginal edge portion of said seat board, the back rest being in abutting engagement with adjacent end portions of said side wings to permit the latter to assist in holding the back rest in its erect position, and stay devices connected with the back rest and seat board also coacting with the seat board and back rest to hold the latter in a predetermined erect position.

8. A convertible chair construction comprising a portable relatively stationary base unit embodying a leg supported top board, said top board being provided centrally with a keyhole slot and further provided with a keeper socket eccentric to the slot, and a readily attachable and detachable seat unit complemental to said base unit and embodying a seat board superimposed on said top board and corresponding in shape and size to said top board, said seat board being provided in its central underside with an L-shaped pocket, a T-shaped latch pin hingedly mounted on said underside and having an L-shaped shank, said L-shaped shank being wholly foldable to an out of the way position into said L-shaped pocket, said L-shaped shank constituting a latch pin proper and being releasably fitted into said keyhole slot, and a keeper slidably mounted on said seat board eccentric to the latch pin and arranged to releasably fit into said keeper socket, whereby to prevent relative rotation of the boards and to thereby maintain the latch pin in desired latching position.

9. In a convertible chair, a seat unit adapted to be supported, when in use, from relatively stationary supporting means, said unit comprising a seat board, a pair of foldable side wings hingedly connected to opposite longitudinal edge portions of said seat board, a back rest hingedly mounted on another marginal edge portion of the seat board, said back rest, when in erect position being adapted to rest against adjacent end portions of said side wings, the latter serving to assist in maintaining the back rest in erect position and against swinging movement in the direction toward the seat board, stay devices connected respectively with the back rest and seat board to prevent the back rest from swinging in a direction away from the seat board, a tray having its end portions sitting atop the top edges of said side wings, said tray being provided on its underside with abutments and said wings being engageable with said abutments, means also carried by said tray and releasably engageable with the wings to hold the tray between the wings and to consequently keep the wings spread apart for purposes of supporting the back rest.

ARTHUR J. WEATHERSON.

REFERENCES CITED

The following references are of record in the file of this patent:

UNITED STATES PATENTS

| Number | Name | Date |
|---|---|---|
| 198,491 | Freshman | Dec. 25, 1877 |
| 227,913 | Merrill | May 25, 1880 |
| 587,845 | Mitchell | Aug. 10, 1897 |
| 878,040 | Burke | Feb. 4, 1908 |
| 1,321,982 | Choate | Nov. 18, 1919 |
| 1,656,352 | Groll | Jan. 17, 1928 |
| 1,832,486 | Johnson | Nov. 17, 1931 |
| 2,399,792 | Copp | May 7, 1946 | as shown in dotted lines for instance in Figure 18. Hence, the two latch devices (latch pin and keeper bolt 51) co-act in assembling and detachably securing the units together to provide the stated convertible chair.

I next call attention to the stirrup-like foot rest. This is a detachable part which is usable according to circumstances and requirements. This part, as a unit, is denoted by the numeral 67 and comprises a substantially V-shaped stirrup. It is a wooden stirrup and provided with hooks 68 detachably connectable with eyes or the like 68a carried by the seat or chair unit 43. In order to support this in the proper inclined position in relation to the high-chair as a unit I provide an arm 69 which is hingedly mounted at 70 which has bends or kinks 70a providing retaining elements and engageable with a cleat 71 nailed on the front leg frame of the stool.

I next call attention to a part of somewhat secondary importance; namely, the detachable high-chair tray. This is referred to by the numeral 72 and is shown in Figure 17. It comprises a tray 73 having wooden cleats on the underside provided with guides 74 for projectible and retractible retaining pins 75. These pins are hinged to and operated by finger-pieces 76 mounted on a wear plate 77 and provided with lugs operable in a guide cylinder 78, said lugs having return springs 79 connected thereto. This provides a simple engaging and releasing mechanism for attaching the tray to the walls or wings of the high-chair when said walls 45 are set up for use.

The foot rest means just described is used primarily in connection with a high-chair as shown in Figures 1 and 2. It can be used, however, in connection with the seat or chair when the latter is employed as a swing, for example, as shown in Figure 9. In the latter figure it will be seen that I employ suspension ropes 80 on opposite sides of the chair with the reaches 81 and 82 connectable to the aforementioned eye bolts 56 and 57. As a general proposition I have found it advisable to provide the reaches 82 with expansible and contractible V-shaped spring clips 83 which snap into the aforementioned clips 58 on the back of a chair. This facilitates assembling and retaining the ropes in place to permit the structure to be employed as a so-called swing.

Instead of depending on the side wires in limiting the outward swing of the side wings of the chair seat, I recommend the use of stop brackets. These brackets are denoted by the numerals 81 and have end portions 82 projecting into the path of swing of said wings or sides. It follows therefore that the outward swinging positions of said wings are limited to prevent overspreading.

Changes in shape, size, materials and rearrangement of details and parts may be resorted to in actual practice, so long as they do not depart from the spirit of the invention or the scope of the appended claims, as is well understood.

I claim:

1. A convertible chair construction of the class shown and described comprising a base unit embodying a leg supported board provided centrally with a keyhole slot and provided eccentrically with a complemental keeper socket, and a seat unit embodying a seat board superimposed on said first named board, said seat board being provided on its underside with a centrally located latch pin, said latch pin passing downwardly through said slot and having a lateral detent releasably engageable with the underside of said first named board, and a keeper eccentrically mounted on said seat board and projecting below the bottom surface of the seat board and fitting releasably into said keeper socket, whereby the keeper fitting into the keeper socket fixes the two boards against relative rotation and thus maintains positive latched connection between the two boards.

2. The structure specified in claim 1, together with a slotted collar fixedly mounted on the bottom of said first named board, the slot in said collar being in registry with said keyhole slot, said collar being of metal and providing a wear surface for said lateral detent.

3. A convertible chair construction of the class shown and described comprising a base unit embodying a horizontal basing board and supporting legs for said board, said board being provided at its center with a keyhole slot, the slot extending through the board and the board being provided on its underside with a wear member, said wear member being provided with a slot in registry with said first named slot, and a seat unit complemental with the base unit and embodying a seat board corresponding in shape and size to the first named board, said seat board being provided at its center with an assembling and latching pin passing through the keyhole slot and provided on its lower end with a lateral detent, said detent being releasably engageable with said wear member, said basing board being provided, eccentrically with respect to the keyhole slot, with a keeper socket, and a keeper eccentrically and slidably mounted on said seat board and in registry with and releasably seated in said keeper socket, the keeper fitting into said socket serving to prevent relative rotation of said boards.

4. The structure specified in claim 3, together with a pair of complemental side wings hingedly mounted on marginal edge portions of said seat board, said keeper being in alignment with the hinged edge portion of one of said wings, and the latter being in direct engagement with said keeper so that it serves to press the keeper down and maintain the same seated in said keeper socket.

5. The structure specified in claim 3, together with a pair of complemental side wings hingedly mounted on marginal edge portions of said seat board, said keeper being in alignment with the hinged edge portion of one of said wings, and the latter being in direct engagement with said keeper so that it serves to press the keeper down and maintain the same seated in said keeper socket, said keeper being provided with a return spring and said spring coming into play to release the keeper from the keeper socket when the coacting hinged wing is swung out of engagement with the keeper.

6. A convertible chair construction of the class shown and described comprising a base unit embodying a leg supported board provided with a central slot and further provided with an eccentrically arranged keeper socket, and a seat unit embodying a complemental seat board superimposed directly on said first named board and corresponding in size and shape to the latter and provided on its underside with a centrally disposed latch pin, said latch pin being releasably and rotatably connectable with said slot, said seat board being provided eccentrically and adjacent one marginal edge with a spring released keeper, said keeper being projectable above and below top and bottom surfaces of the seat board, the